Nov. 6, 1928. 1,690,169
J. JACKSON
EGG TURNER FOR INCUBATORS
Filed Dec. 2, 1927   3 Sheets—Sheet 1
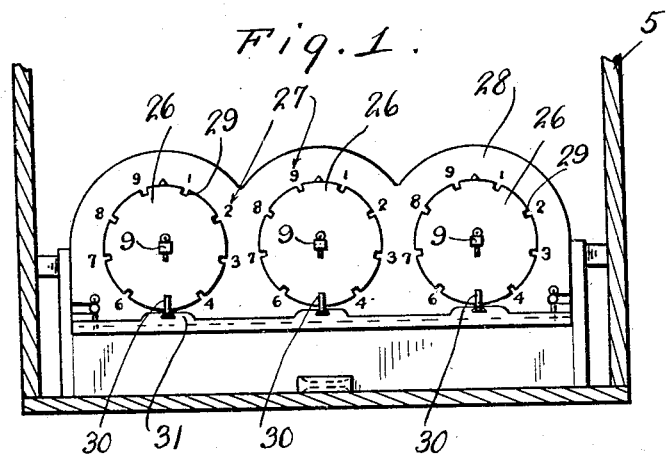
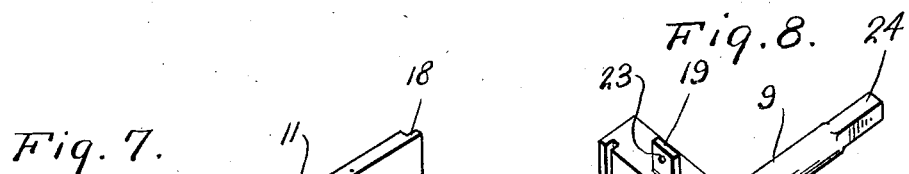
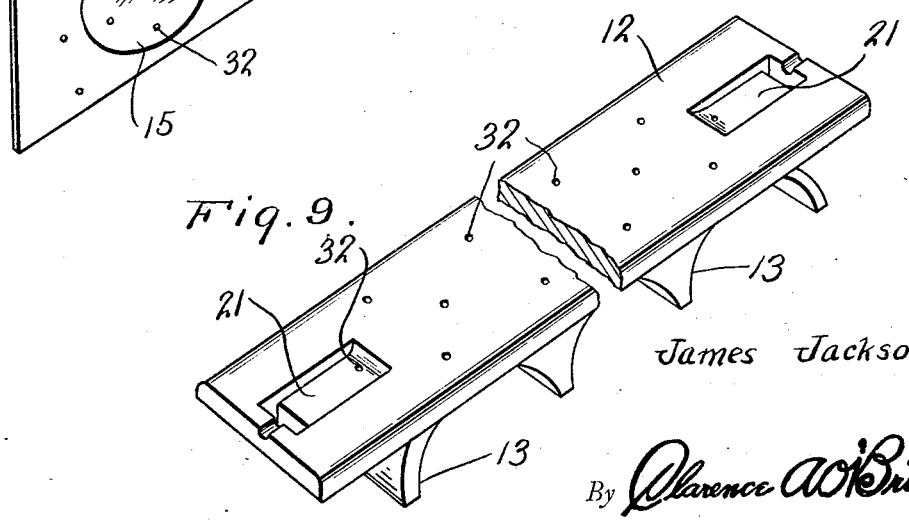
Inventor
James Jackson
By *Clarence A. O'Brien*
Attorney Nov. 6, 1928.                                                              1,690,169
J. JACKSON
EGG TURNER FOR INCUBATORS
Filed Dec. 2, 1927                  3 Sheets-Sheet 2

Inventor
James Jackson

By Clarence A. O'Brien
Attorney

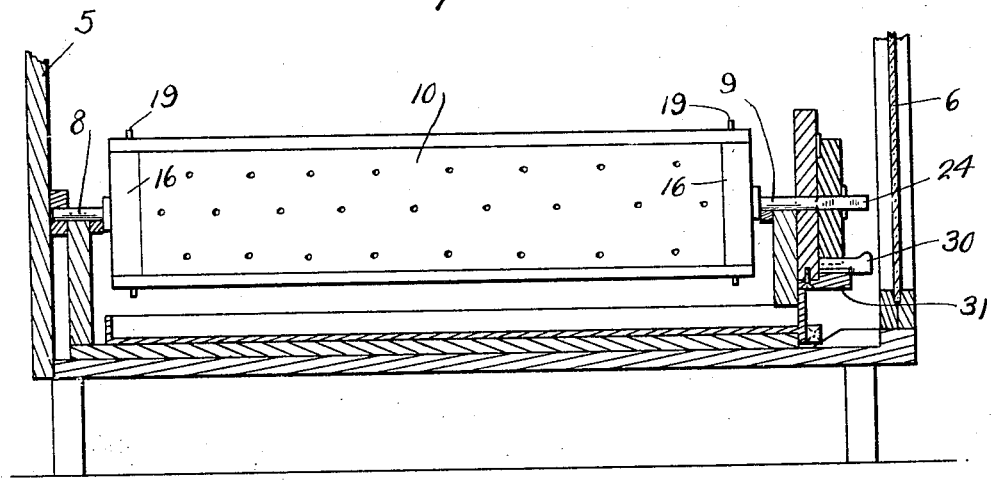
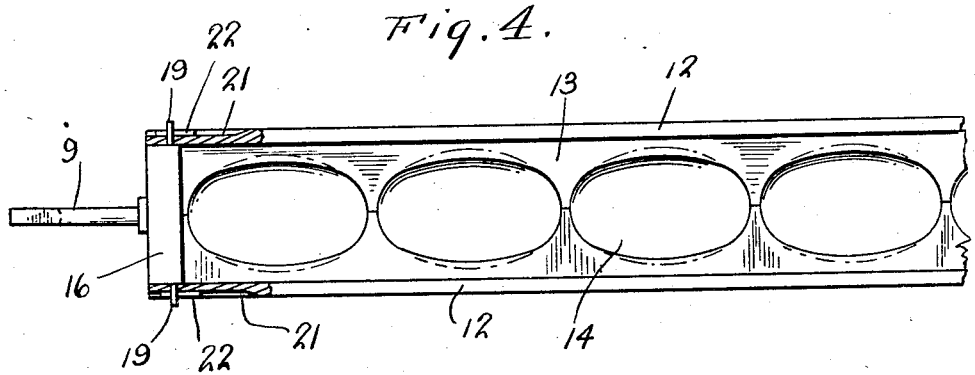
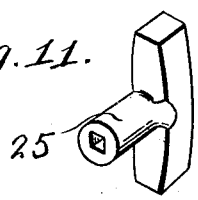
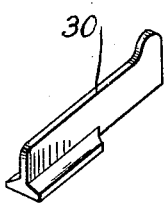

Patented Nov. 6, 1928.

1,690,169

UNITED STATES PATENT OFFICE.

JAMES JACKSON, OF BAKERSFIELD, CALIFORNIA.

EGG TURNER FOR INCUBATORS.

Application filed December 2, 1927. Serial No. 237,207.

This invention relates to incubators and has for its principal object to provide a plurality of rotatably mounted egg containers, each container having individual means for manually rotating the same from time to time as the incubation progresses.

An object of the invention is to provide a sectional container composed of a pair of oppositely arranged walls each of which is provided with a section of egg racks adapted to cooperate when secured in position to firmly hold the eggs within the container for movement therewith, the ends of the container being provided with detachable plates arranged for securing the walls of the container in assembled position, said ends of the plates having stub shafts extending outwardly therefrom adapted to support the containers for rotation.

Another object of the invention is to provide an indicator at one end of the containers by means of which the extent of the turning movement of each container may be readily determined, including means for ascertaining the direction of previous movement of containers and lock means for retaining the containers against movement.

A still further object is to provide an egg tray of this character for incubators of a simple and practical construction, which enables the turning of the containers to proceed in a regular and uniform manner so that all of the eggs within the incubator may be adjusted in different positions to an equal extent, which eliminates the turning of each egg by hand, which is inexpensive to manufacture and install in operative position and otherwise well adapted for the purpose for which it is intended.

Other objects and advantages reside in the special construction and combination of the various elements comprising the invention, reference being had to the accompanying drawings forming a part thereof, wherein:—

Figure 2:
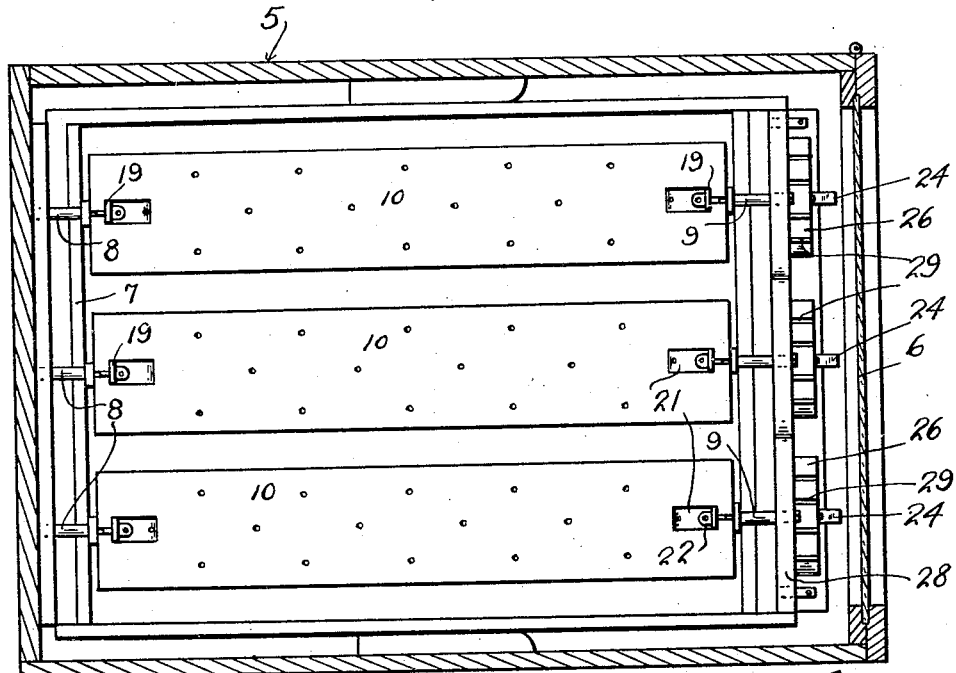
Figure 5:
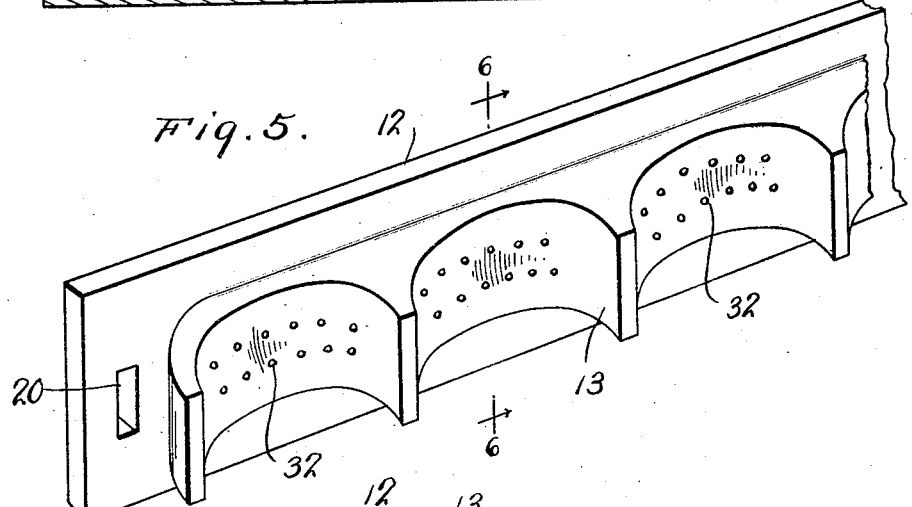
Figure 6:
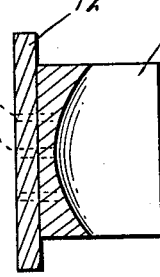

Figure 1 is a front elevational view of a row of egg containers shown in position in the incubator, Figure 2 is a top plan view thereof, Figure 3 is a side elevational view, Figure 4 is a fragmentary side elevational view of one of the containers with one side removed therefrom so as to show the coacting position of the egg rack, Figure 5 is a fragmentary perspective view of the inner wall of one of the container sections provided with one of the egg racks, Figure 6 is a transverse sectional view taken along line 6—6 of Figure 5, Figure 7 is a perspective view of one of the side walls of the container, Figure 8 is a similar view of one of the end attaching plates showing the operating shaft extending therefrom, Figure 9 is a similar view of the outer surface of one of the walls of the container illustrating the recess provided for receiving the plate locking pin, Figure 10 is a perspective view of one of the keys provided for locking the container against rotation and Figure 11 is a perspective view of the key provided for rotating the containers.

Referring to the drawings in detail, I have shown my invention adapted for use in connection with an incubator of conventional construction and indicated generally at 5 having the door 6 hingedly mounted at one end thereof. Within the incubator is arranged the frame 7, the upper edge of which forms a support for the stub shafts 8 and 9 extending outwardly from the opposite ends of egg containers shown generally at 10.

Each of the containers is of a substantially rectangular formation, preferably arranged in a square shaped formation in cross section and composed of a plurality of side sections 11 and 12.

The side members 12 each have their inner faces provided with sections of egg racks 13, combining with each other as shown in Figure 4 of the drawings to form pockets 14 within each of which an egg may be placed and firmly retained for rotation with the container. The side sections 11 at spaced intervals are provided with countersinks 15 along their inner faces and arranged to register with the pockets 14 formed by the sections of egg racks within which the sides of the egg may be received to further retain the eggs against movement within the container and facilitate the rotation of the eggs with the turning movement of the container.

The ends of the containers are held together by plates 16, the inner face of each of said plates having grooves 17 formed adjacent opposite sides thereof and adapted to slidably receive the tongues 18 formed at the opposite end.

The edges of the plates 16 opposite from the grooves 17 are provided with laterally extending lugs 19 adapted to be inserted in openings 20 formed in the opposite ends of the side sections 12 of the container in a manner so as to protrude slightly above the outer face of the container. The outer face of the container adjacent the protruding end of the lugs 19 is recessed as indicated at 21 whereby to receive a locking pin 22 for insertion through an opening 23 formed in the lug whereby to retain the slides 12 of the container in fixed position with respect to the plates 16.

The outer faces of the plates 16 carry the stub shafts 8 and 9, heretofore referred to whereby to support the containers for rotary movement within the incubator. The end of the shaft 9 is arranged in square shaped formation in cross section as indicated at 24 upon which a key 25 may be fitted whereby to provide for the rotation of the container carried thereon. The shaft 9 is also provided with an indicator 26 cooperating with a dial 27 displayed on a plate 28 mounted in the incubator adjacent the door 6 so that the extent of turning movement of the container may be instantly determined by a comparison of the dial with the indicator. The periphery of the indicator is provided with the plurality of notches 29 adapted to receive a key 30 slidably mounted in a support 31 disposed adjacent the edge of the indicator, said key serving to lock the indicator and the container to which the same is attached against movement. It is therefore to be understood that whenever the container is to be rotated the key 30 will be withdrawn from interengagement with the notch 29 after which the container may be rotated in a predetermined manner and to a desired extent which, under the usual procedure will bring the next succeeding notch in position for receiving the key 30 which may then be used to retain the container against rotation until the further turning thereof is desired.

Each of the side sections 11 and 12 forming the container is provided with a plurality of relatively small openings or perforations 32 providing for the proper ventilation of the interior of the container.

It will be apparent from the foregoing explanation that the turning of the container in a manner to promote the hatching of the eggs in an approved manner may progress uniformly throughout the incubator so that each of the eggs will be turned at one time to an equal extent. Furthermore it is important to note that the eggs should be only partially turned at regular intervals and the turning movement must continue in a uniform direction in order to produce the best results. It will therefore be apparent that the indicator provides means for ascertaining the proper direction in which each successive turning movement of the containers must be made.

It is obvious that the invention is susceptible of various changes and modifications, without departing from the spirit or scope of the invention or sacrificing any of its advantages, and I accordingly claim all such forms of the device to which I am entitled.

Having thus described my invention, what I claim as new is:

An egg tray for incubators comprising a plurality of tray sections, including a pair of oppositely arranged sections having egg racks formed thereon cooperating with each other and with the remaining sections to retain the eggs in position therein against independent movement therebetween, end plates for said sections engageable therewith for retaining the same in assembled position, said end plates forming a tongue and groove connection with certain of said side sections of the tray, a pair of lugs extending laterally from opposite ends of said plate, said other side sections of the tray having openings formed therein adapted to receive said lugs, locking pins for securing the lugs in engaged position in the openings, shafts extending from the outer faces of said plates, an indicator carried by one of said shafts and adapted for simultaneous rotation therewith, a dial arranged adjacent the indicator, notches formed about the periphery of the indicator and a key engageable with said notches adapted to retain the indicator and tray against rotation.

In testimony whereof I affix my signature.

JAMES JACKSON.